United States Patent [19]

Bottles

[11] 3,894,216

[45] July 8, 1975

[54] ILLUMINATION AND SENSOR ARRANGEMENT FOR CARD READER

[75] Inventor: David M. Bottles, Long Beach, Calif.

[73] Assignee: Compucorp, Los Angeles, Calif.

[22] Filed: July 27, 1973

[21] Appl. No.: 383,383

[52] U.S. Cl........................... 235/61.11 E; 250/555

[51] Int. Cl........................... G06k 7/10; G08c 9/06

[58] Field of Search....... 235/61.11 E; 250/555, 566

[56] References Cited

UNITED STATES PATENTS

| | | | |
|---|---|---|---|
| 3,676,690 | 7/1972 | McMillin et al. | 235/61.11 E |
| 3,784,832 | 1/1974 | Sewell | 235/61.11 E |

*Primary Examiner*—Daryl W. Cook

*Attorney, Agent, or Firm*—Lindenberg, Freilich, Wasserman, Rosen & Fernandez

[57] ABSTRACT

A card reader for marked cards is provided which utilizes a low cost and easily mounted lens to concentrate light onto card areas to be read and which also concentrates light from a limited card area onto sensors that detect the marks. A group of light sensors is arranged in a column extending along the width of the card path, and a cylindrical lens extends parallel to the column of sensors and lies between it and the card path, so that reflected light from only a limited area of the card path is concentrated onto each sensor. A group of light sources is interspersed with the sensors, so that the lens also serves to concentrate light from each light source onto a limited area of the card path which is being "viewed" by an adjacent sensor.

8 Claims, 12 Drawing Figures

ILLUMINATION AND SENSOR ARRANGEMENT FOR CARD READER

BACKGROUND OF THE INVENTION

This invention relates to card readers.

Card readers that can read marks made by pencils or other marking instruments require a light source for illuminating a card and a group of light sensors for detecting the presence of a mark at each of the several row positions of a card. The presence of a mark is detected by the decrease in light reaching the sensor due to the fact that the mark reflects less light than the unmarked card surface. The detection of a mark is difficult because the area around the mark may reflect some light onto the sensor, so that the total light reaching the sensor may decrease by only a small amount due to the presence of a mark. Better discrimination has been attained by utilizing an aperture in front of the sensor to block all light except the light coming from a small area of the card that may be largely occupied by a mark. However, such apertures give rise to many problems. One problem is that the aperture must be close to the card in order to admit considerable light within the mark area while discriminating against light from the surrounding area, which results in difficulty in illuminating the area being "viewed." Sideward illumination can be employed, but this presents difficulties in maintaining accurate alignment between the mechanical apertures and the light sources, particularly where a large number of sensors and their corresponding apertures must be aligned with the light sources. The mechanical apertures are subject to blocking by dirt particles, and therefore gives rise to increased maintenance. If an illumination and sensor arrangement were available which permitted effective concentration of light on a limited card area and the concentration of light from only a limited card area onto a sensor, in an arrangement that did not require tiny mechanical apertures but which instead utilized low cost elements which were easily maintained in alignment, then the cost of a readout station could be reduced while increasing its performance capability.

SUMMARY OF THE INVENTION

In accordance with one embodiment of the present invention, a card reader for reading marked cards as well as punched cards is provided which employs a simplified card illumination and sensing arrangement. The readout station of the card reader includes a column of small sensors arranged along the width of the card path and a cylindrical lens located between the sensors and the card path. The lens concentrates light from a limited area of the card onto each sensor, to increase the amount of light from the limited card area that reaches the sensor while reducing the amount of light from adjacent card areas that can reach the sensor. A column of small light sources, such as light emitting diodes (LED's), is also provided, each LED being positioned close to one of the sensors. The lens also serves to concentrate light from each LED onto a limited card area which contains the region viewed by the adjacent sensor, so that the viewed area is brightly illuminated and adjacent card areas are not brightly illuminated and therefore can reflect only a limited amount of light onto the sensor. The lens is mounted in an assembly which includes baffles that accurately position the lens while isolating each LED and sensor pair from the adjacent pairs, to further increase the selectively of the arrangement.

The novel features of the invention are set forth with particularity in the appended claims. The invention will best be understood from the following description when read in conjunction with the accompanying drawings.

DESCRIPTION OF THE PREFERRED EMBODIMENTS

Figures 1, 2, 3:
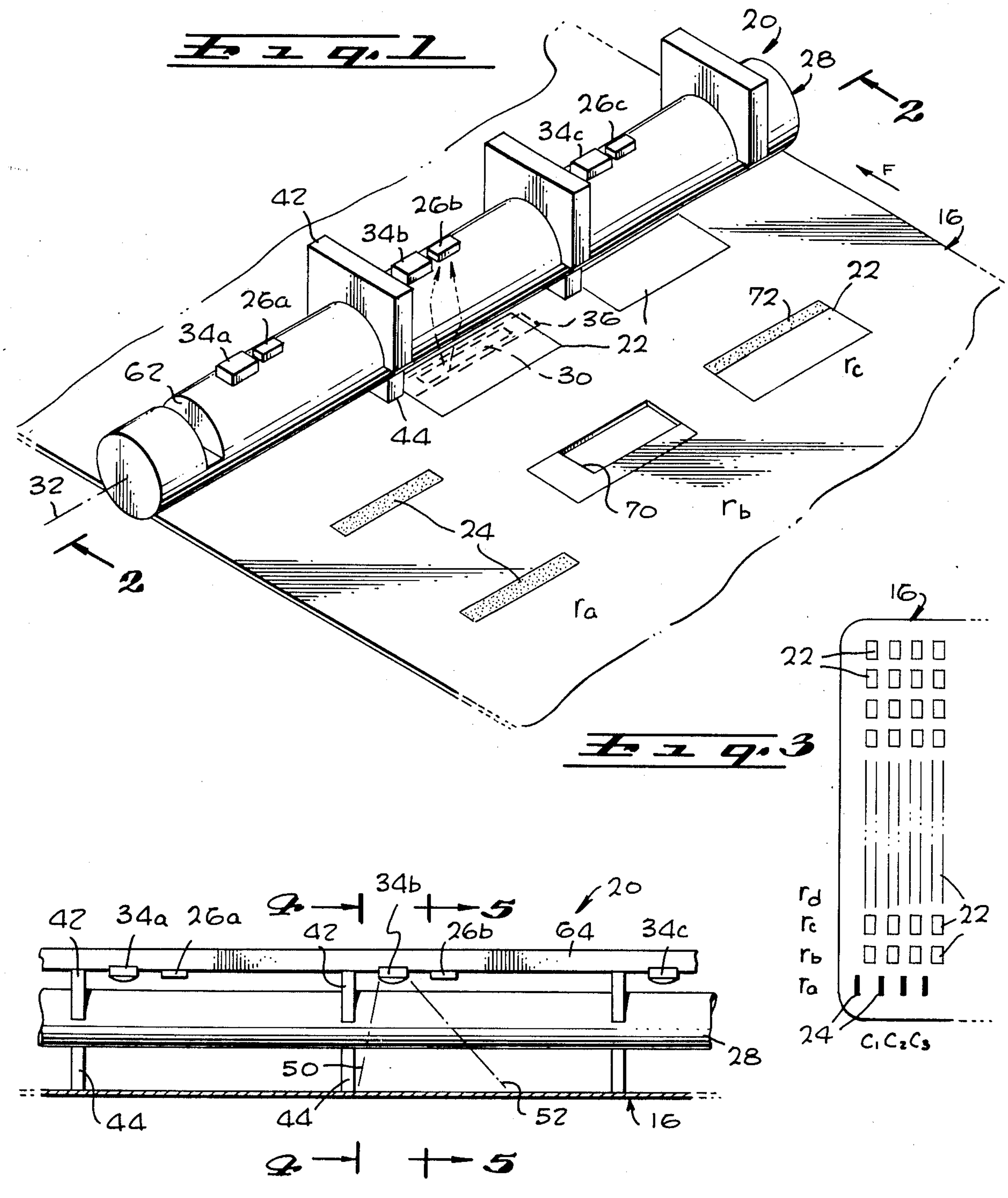
FIG. 1 is a partial perspective view of a card reader constructed in accordance with the present invention.
FIG. 2 is a view taken on the line 2—2 of FIG. 1.
FIG. 3 is a plan view of a portion of a card, showing the arrangement of the markable areas thereon.
Figures 6, 7:
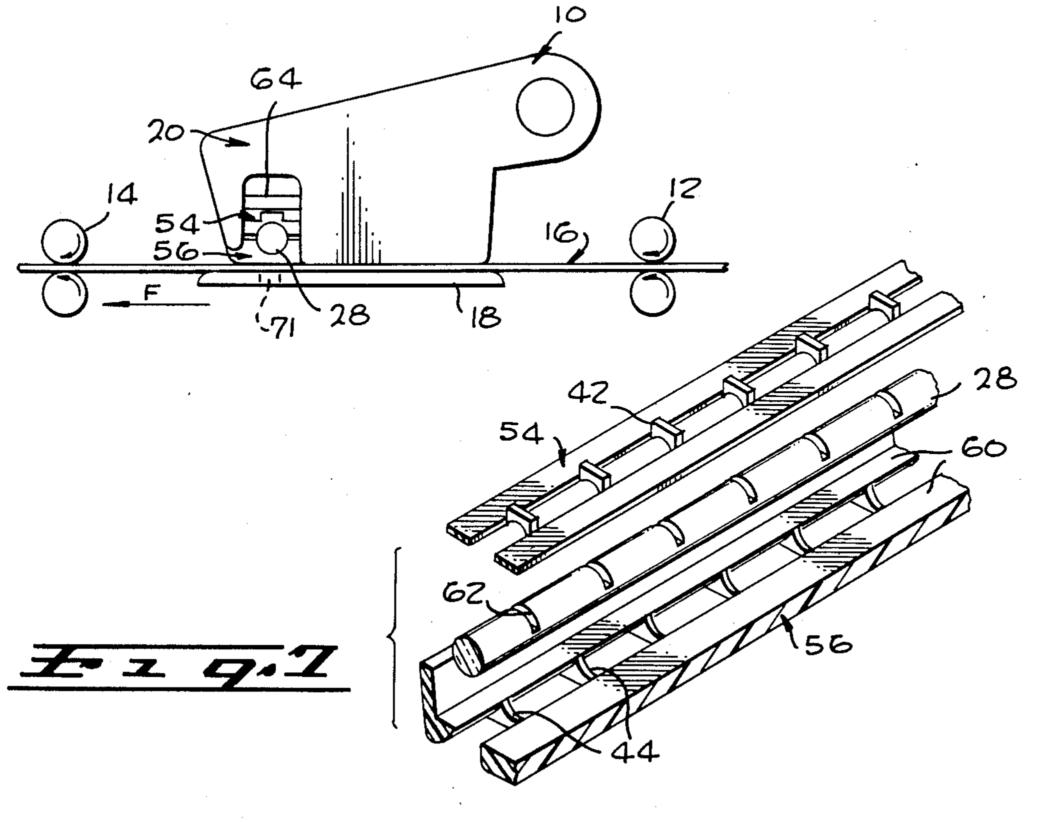
FIG. 6 is a partial side view of the card reader of FIG. 1, showing a portion of the card transporting mechanism and head mounting mechanism thereof.
FIG. 7 is a partial perspective and exploded view of the head mounting mechanism of FIG. 6.
Figure 8D:
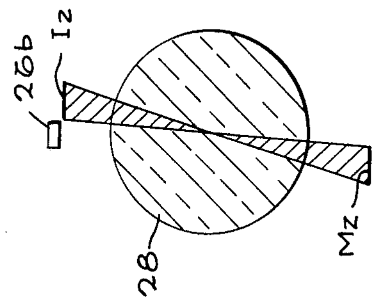
FIGS. 8A through 8D are diagrammatic views of the lens, sensor, and card as shown in FIG. 5, showing how the "image" of a mark is focused on the sensor.
Figure 8C:
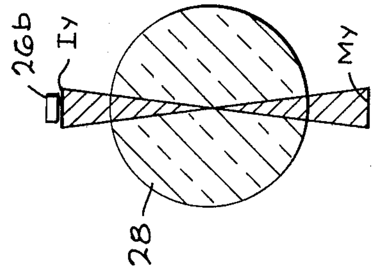
Figure 8B:
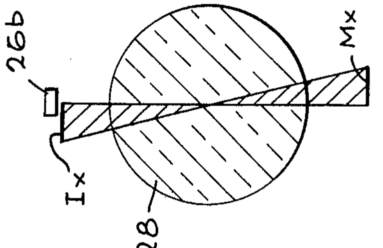
Figure 8A:
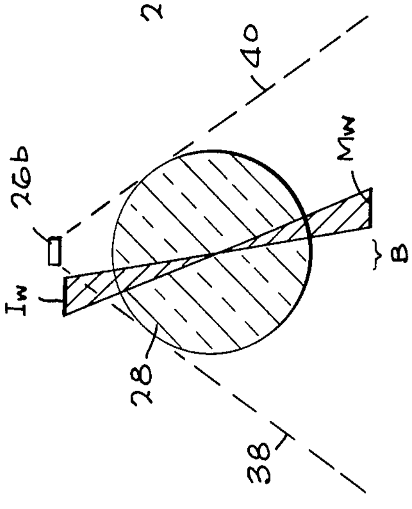

FIG. 6 illustrates the general arrangement of the card reader near the readout station 10 thereof, the card reader including a series of rollers 12, 14, for moving a card 16 in the direction F along a predetermined card path past the readout station. At the readout station 10, the card passes between a backup plate 18 and a head assembly 20, the head assembly directing light at the card to detect the presence of marks and punched holes on the card. As illustrated in FIG. 3, the card 16 has boxes 22 arranged in rows labeled $r_b$, $r_c$, $r_d$, etc., and in columns labeled $c_1$, $c_2$, etc. A first row position $r_a$ is occupied by strobe marks 24 whose purpose will be later described. Information is entered on the card by encoding the areas within the box-like encodable areas, such encoding being accomplished by marking the boxes with a pencil or other instrument or by punching holes thereat. The illumination and sensing apparatus of the invention is designed to illuminate the box regions and sense the presence therein of an encoding by either a mark or hole.

FIGS. 1–7 illustrate details of the head assembly 20 which illuminates the card and detects the presence of encoding thereon. The apparatus includes a group of light sensors 26 arranged in a column, the individual sensors being labeled 26*a*, 26*b*, 26*c*, etc., to correspond to the row positions $r_a$, $r_b$, $r_c$, etc. The column of sensors extends along the width of the card path, that is, the sensors are spaced from one another in a direction transverse to the direction F of cards 16 along the card path. A concentrating lens 28 is positioned between the sensors 26 and the card path to concentrate light from a limited region of the card path onto each sensor. As a result, each sensor such as 26*b* "views" a region 30 of limited dimensions. The lens 28 is cylindrical and is oriented with its axis 32 extending along the width of the card path, so that the region 30 viewed by the sensor has a small thickness along the length of the card path but has an indefinite length along the width of the card path.

The read head assembly 20 also includes a group of light sources 34, the individual sources being labeled 34*a*, 34*b*, 34*c*, etc., and arranged in a column along the width of the card path. Each light source 34 is positioned adjacent to one of the light sensors, and is spaced from its corresponding light sensor in a direction transverse to the length of the card path. Each light source such as 34*b* is designed to illuminate a region such as 36 which contains the area viewed by the corresponding sensor 26*b*. The lens 28 serves to concentrate the light from each light source so that the illuminated card area 36 has a small thickness along the length of the card path. This concentration of light serves two purposes. First, it results in a high illumination intensity at the region 30 viewed by the sensor. Second, it minimizes the illumination of areas outside the viewed area 30 so that there is a minimum of stray light from such outside areas that can fall on the sensor 26*b*.

The sensors 26 are formed by phototransistors which have a small sensitive area such as 0.020 inch along the card path and approximately the same dimension parallel to the width of the card path. The light sources 34 are formed by light emitting diodes (LED) which also have small dimensions along the length and width of the light path, such as 0.040 inch. The lens 28 has a diameter such as one-eighth inch. The light sensor and light source are each spaced from the top of the lens 28, by approximately the same distance as the card 16 is spaced from the bottom of the lens 28, so that the region 30 which is viewed by the sensor and the region 36 which is illuminated by the light source are both small.

Figure 5:
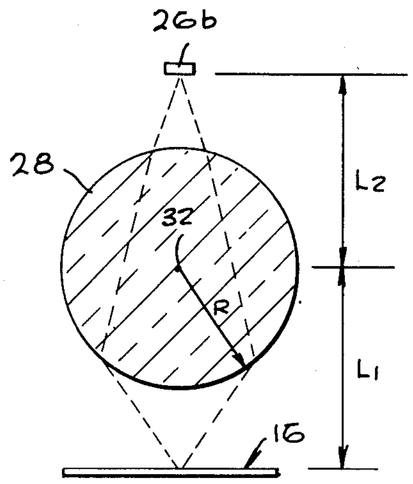
FIG. 5 is a partial view taken on the line 5—5 of FIG. 2.

FIG. 5 illustrates the focusing characteristics of the lens 28 along the length of the card path. It is desirable to form an "image" of a card area on the sensor 26, at least as viewed along the axis 32 of the lens. This is accomplished by positioning the sensor 26*b* at the conjugate focus of the lens 28 with respect to the upper surface of the card 16. The determination of a pair of distance $L_1$ and $L_2$ of the card and sensor from the center of the lens, in order to form an image of the card on the sensor can be calculated by well known methods.

Figure 4:
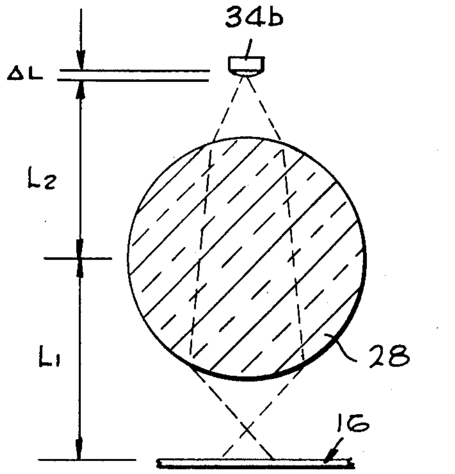
FIG. 4 is a partial view taken on the line 4—4 of FIG. 2.

FIG. 4 illustrates the positioning of the light source 34*b* from the card path 16. The light source 34*b* could be positioned at the conjugate focus of the lens 28 with respect to the card, to provide maximum concentration of the light onto the card. However, for the small light source 34*b*, this would result in only a very narrow band of illumination at the card, and even a moderately small tolerance in the positioning of the light source could mean that the illuminated area 36 did not cover all of the area 30 "viewed" by the sensor 36*b* through the lens. In order to permit greater tolerance in positioning of the light source with respect to the sensor, the light source 34*b* may be positioned a small distance $\Delta L$ away from the conjugate focus point so that a larger card area is illuminated.

FIGS. 8A–8D illustrate the manner in which the image I of a mark passes across the sensor 26*b* as the card and its mark M move along the card path. At the mark position $M_w$, the "image" $I_w$ of the mark does not cover any portion of the sensor 26*b*, while at the mark positions $M_x$ and $M_y$, the images $I_x$ and $I_y$ respectively cover part or all of the sensor. After the mark has moved to position $M_z$, its image no longer covers any of the sensor. As the mark moves along the card path, the illumination of the sensor 26*b* will not decrease until the mark reaches a position almost precisely opposite the sensor. The illumination of the sensor will then rapidly decrease until its entire area is covered by the image of the mark. Of course, this is due to the fact that unmarked areas of the card which lie in front or behind the mark will not be imaged on the sensor 26*b* when the mark is imaged thereon. In fact, light from a wide area of the card within the boundaries 38 and 40 will not be able to reach the sensor except for light within the small band B lying directly opposite the sensor. Light outside the boundaries 38 and 40 are blocked by other walls of the readout head assembly.

The lens 28 has substantially no light concentrating effect along a direction parallel to its axis 32. This means that the region 30 (FIG. 1) viewed by the sensor 26*b* through the lens could be of indefinite dimension along the width of the card path, unless other steps were taken to effectively limit this area. The effective lateral dimension of this viewing area 30 is limited in two ways. First, the area is limited on one side by baffles 42, 44 that prevent light from the row $r_a$ from reaching the sensor 26*b*. Second, the light source 34*b* is positioned so that the illumination intensity decreases rapidly at positions progressively closer to the row position $r_c$. The light source 32*b* is positioned between the sensor 26*b* and the baffle 42, so that the illumination intensity is considerable only within approximately the boundaries 50, 52 (FIG. 2). The illumination intensity due to the light source 34*b* is very low beyond the boundary 50 because the baffles 42, 44 block most of the light. The illumination intensity beyond the boundary 52 decreases because of the progessively greater distance and angle of incidence of light rays on the card, and because the lens 28 reflects light rays incident thereon at a low angle rather than transmitting them. Light beyond the boundary 52 further has a relatively small effect on the sensor 26*b* because of the progessively greater distance to the sensor 26*b*. It is possible to provide additional baffles at the boundary 52, but this generally is not necessary.

The baffles 42 and 44, which are formed as ribs in members 54, 56, as best shown in FIGS. 6 and 7, also serve to accurately position the lens 28 and the sensors 26 and light sources 34. The member 56 is part of a housing which supports the other elements of the head assembly 20 in position. The lower baffles 44 have concave upper surfaces in which the cylindrical lens 32 nests and have substantially straight lower surfaces that guide the card in movement along its path. The upper member 54 which forms the upper baffles 42, rests on areas 60 of the housing member 56. The cylindrical lens 28 has slots 62 extending approximately half way through the lens, and the upper baffles 42 are received in these slots. The baffles 42 therefore can extend to a low position to stop a large portion of sidewardly directed light, and also serve to hold the lens in position. The upper surface of the baffles 42 rests against the surface of a printed circuit board 64 on which the LED light sources 34 and phototransistor sensors 26 are mounted. The board 64 is mounted to press resiliently against the upper baffles 42, at which position the light sources and sensors are located at a closely controlled distance from the top of the cylindrical lens 28.

The use of a single cylindrical lens 28 greatly simplifies the construction of the readout station. It would be possible to utilize a separate lens for each sensor-source pair, but this would necessitate provisions for maintaining accurate alignment of each lens with respect to the light source and light sensor. It is also possible to utilize a single lens but to form individual lens regions that are convex along two axes instead of only the one axis 32, but this would greatly increase the expense of manufacture and necessitate provisions for more accurate mounting of the lens. The use of a simple rod of transparent material such as an acrylic, permits construction and mounting of the lens at very low cost while assuring accurate alignment.

The readout station 20 is capable of reading punched holes such as the hole 70 shown in FIG. 1. The backup plate 18 (FIG. 6) has a row of holes, one hole under each sensing area, so that a hole in the card results in light passing through the backup plate without reflection, which is sensed as a mark. Where every mark on the card will cover nearly the entire area within an encoding area defined by a box 22, or at least the middle portion thereof, it is possible to read out the state of the sensors 26 at the time that the middle of each column of boxes is positioned directly under the lens 28. In those cases where the thickness of the mark may be less than the thickness of the boxes 22 and may not cover the middle portion of the box, as in the case of the mark 72 (FIG. 1) another type of readout scheme of the type shown in FIG. 9 may be employed.

Figure 9:
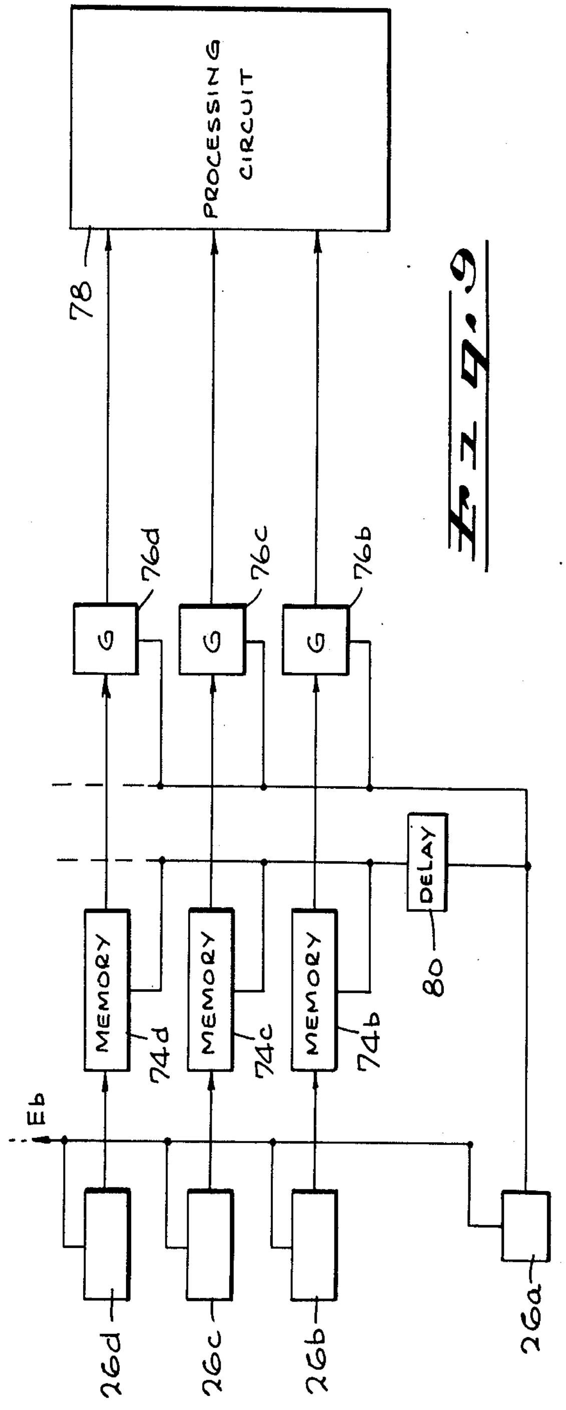
FIG. 9 is a highly simplified block diagram of the processing circuit of the card reader of FIG. 1.

FIG. 9 illustrates a signal processing circuit which permits readout of marks that may have a variety of positions within the boxes 22. Each of the phototransistor sensors 26*a*, 26*b*, 26*c*, etc., experiences a sudden increase in resistance when the amount of incident light suddenly drops due to the image of a mark covering the sensor. Each of the sensors is connected to a voltage source $E_b$ so that an appreciable current can flow through the sensor, but the current suddenly drops when a mark covers the sensor. Each of the sensors except the first one 26*a*, is connected to a memory 74*b*, 74*c*, 74*d*, etc. which can be placed in set or reset states. When any of the sensors 26*b*, 26*c*, etc., senses a mark, it sets the corresponding memory 74*b*, 74*c*, etc. The first sensor 26*a* is positioned to sense strobe marks 24 which are preprinted or prepunched into the card at positions between the columns of boxes 22. When each strobe mark 24 is sensed, the sensor 26*a* delivers a signal to a group of gates 76*b*, 76*c*, 76*d*, etc., to open the gates. Each of the gates connects a corresponding memory 74 to a processing circuit 78 which processes the signals that indicate the presence or absence of a mark, in a manner commonly used in card readers. The signal from the strobe sensor 26*a* is also delivered through a delay circuit 80 to each of the memories 74*b*, 74*c*, etc., to reset the memories, so that a short time after each memory has delivered its contents to the processing circuit 78, the memory is reset. The resetting occurs prior to the next column of boxes 22 reaching a position opposite the sensors, so that each column of boxes can be read out in sequence.

The card 16 is normally preprinted with borders defining the boxes 22 and with strobe markings 24. The LED light sources 34 may be of a type that emits red light, and the boxes 22 defining the areas for receiving marks may be printed with red ink so that the box borders are not detected by the sensors. The strobe markings 24 may be printed with blue or black ink or merely punched in the card.

Thus, the invention provides a card reader with light sensors that are sensitive to marks within a limited area using a simple construction that eliminates the need for mechanical apertures and the like. This is accomplished by utilizing a lens which concentrates light from a narrow band at the card path onto each sensor, or in other words which forms an image (with respect to the length of the card path) onto the sensor. In addition the lens is utilized to to concentrate light from a source onto a band of limited width which contains the region viewed by the sensor. A simple cylindrical lens can be utilized which extends under many or all of the sensor-source pairs, to simplify mounting and alignment. Baffles are also employed to limit the sideward viewing of the sensor through the lens and to limit sideward illumination by the sources. The lens and baffles form a light control means of low cost and high reliability, for concentrating light in a limited area. The apparatus is useful not only for typical IBM-type cards, but for any other form of material with encoding thereon.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A card reader capable of reading marks on a card, comprising:

means for moving cards along a predetermined card path;

a light sensor spaced from said card path;

a light source positioned on the same side of said card path as said light sensor; and a lens on the same side of said card path as said light sensor, said lens being positioned to concentrate light from the light source onto a region of a card and to form an image, at least along a direction parallel to the card path, of at least a portion of said card region onto said light sensor.

2. The card reader described in claim 1 wherein:

said lens means comprises a transparent lens which is curved only about an axis transverse to the direction of card movement along the card path, and said light source and light sensor are spaced from one another in a direction transverse to the direction of card movement along the card path.

3. The card reader described in claim 1 including:

a plurality of additional light sensors, said first named and additional sensors being spaced from one another in a direction transverse to the direction of card movement along the card path; and wherein said lens means comprises an elongated lens curved substantially only in a direction perpendicular to its length, and said lens is oriented with its length extending along the width of the card path and positioned between the sensors and card path.

4. A card reader for reading marks or other encoding on a card that moves along a predetermined card path, comprising:

a light sensor spaced from said card path;

a light source spaced from said card path; and light control means including a lens positioned so it lies between the card path and both the sensor and light source, said lens concentrating light from the source onto a predetermined card path location and focusing light from within said location onto said light sensor.

5. The card reader described in claim 4 including:

a plurality of additional light sensors and light sources arranged in pairs, each pair including a sensor and a source; and wherein said lens is curved more strongly in a direction along the length of the card path than along the width of the card path;

the light source of each source-sensor pair is spaced from the light sensor of the same pair along a direction transverse to the length of the card path; and said light control means includes a plurality of baffles, each baffle separating a source-sensor pair from another source-sensor pair.

6. In a card reader that moves markable cards along a predetermined card path, the improvement comprising:

a plurality of light sensors arranged in a column extending along the width of the card path, the sensors being spaced from the card path;

an elongated lens which is curved substantially only about an axis extending parallel to the width of the card path, said lens positioned between the card path and the row of sensors to concentrate light from a different limited area of the card path onto each sensor;

a plurality of light source means, each located between a pair of said light sensors and positioned adjacent to one of the light sensors, each light source means positioned so that the lens concentrates light therefrom onto a card path area whose light is concentrated by the lens onto the adjacent light sensor; and baffle means having a plurality of light baffles, each light baffle positioned beside a light source means to minimize light transmissions in a direction transverse to the length of the card path.

7. The improvement described in claim 6 wherein:

said lens has a plurality of slots therein, and said baffles are received in said slots.

8. Apparatus for detecting marks or other encoding on a document that moves along a predetermined path, comprising:

a light sensor spaced from said path;

a light source spaced from said path; and light control means including a lens positioned so it lies between the path and both the sensor and light source, said lens concentrating light from the source onto a predetermined path location and concentrating at least some of the light from within said location onto said light sensor.

* * * * *